(12) United States Patent
Ernst

(10) Patent No.: US 10,661,655 B2
(45) Date of Patent: May 26, 2020

(54) METHOD FOR OPERATING A MOTOR VEHICLE, AND MOTOR VEHICLE

(71) Applicant: AUDI AG, Ingolstadt (DE)

(72) Inventor: Herbert Ernst, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/243,431

(22) Filed: Jan. 9, 2019

(65) Prior Publication Data
US 2019/0225087 A1    Jul. 25, 2019

(30) Foreign Application Priority Data
Jan. 24, 2018    (DE) .................. 10 2018 201 036

(51) Int. Cl.
*B60L 3/00*    (2019.01)
*B60L 15/20*    (2006.01)
(Continued)

(52) U.S. Cl.
CPC ......... *B60L 3/0076* (2013.01); *B60L 15/2009* (2013.01); *B60T 8/3215* (2013.01);
(Continued)

(58) Field of Classification Search
CPC ............... B60L 3/0076; B60L 15/2009; B60L 2220/44; B60L 2240/12; B60L 2260/22;
(Continued)

(56) References Cited

U.S. PATENT DOCUMENTS

| 5,775,784 A * | 7/1998 | Koga ............... B60L 3/0023 303/122 |
| 2004/0039525 A1* | 2/2004 | Draeger ............... G01C 21/343 701/431 |

(Continued)

FOREIGN PATENT DOCUMENTS

| CN | 104960435 A | 10/2015 |
| CN | 107407405 A | 11/2017 |

(Continued)

OTHER PUBLICATIONS

The extended European search report dated Jul. 17, 2019, in corresponding European application No. 18211928.9 including partial machine-generated English language translation; 11 pages.

(Continued)

*Primary Examiner* — Jonathan M Dager
*Assistant Examiner* — Jean W Charleston
(74) *Attorney, Agent, or Firm* — Maier & Maier, PLLC

(57) ABSTRACT

A method is indicated for operating a motor vehicle, as well as a motor vehicle, having an electric machine for the positive or negative acceleration of the motor vehicle as well as a mechanical brake device for reducing the vehicle speed of the motor vehicle. In a special brake operation mode, a deceleration demand (V) is detected, and a target rotational speed curve ($n_{soll}$) of the electric machine is determined in dependence on the deceleration demand (V). An actual rotational speed ($n_{ist}$) of the electric machine for reducing the vehicle speed of the motor vehicle is then adapted to the target rotational speed curve ($n_{soll}$) so determined.

9 Claims, 1 Drawing Sheet

(51) Int. Cl.
  *B60W 10/196* (2012.01)
  *B60W 30/18* (2012.01)
  *B60T 8/32* (2006.01)

(52) U.S. Cl.
  CPC .... *B60W 10/196* (2013.01); *B60W 30/18127* (2013.01); *B60L 2220/44* (2013.01); *B60L 2240/12* (2013.01); *B60L 2260/22* (2013.01)

(58) Field of Classification Search
  CPC ........... B60T 8/3215; B60W 30/18127; B60W 10/196
  USPC ............ 701/76, 78, 81, 22, 29.1, 33.7, 33.9
  See application file for complete search history.

(56) References Cited

U.S. PATENT DOCUMENTS

| | | | | |
|---|---|---|---|---|
| 2010/0268430 | A1* | 10/2010 | Bentner | B60T 7/12 701/70 |
| 2010/0308759 | A1* | 12/2010 | Hohn | B60L 15/025 318/400.09 |
| 2017/0326979 | A1* | 11/2017 | Davis | B60W 30/18 |
| 2018/0106367 | A1 | 4/2018 | Mouri et al. | |
| 2018/0224867 | A1* | 8/2018 | Yu | G06Q 10/08 |
| 2018/0244258 | A1* | 8/2018 | Mouri | B60K 6/543 |

FOREIGN PATENT DOCUMENTS

| | | | | |
|---|---|---|---|---|
| DE | 10 2008 003 379 | A1 | 7/2009 | |
| DE | 102012106535 | A1 * | 1/2014 | ............ B60L 15/20 |
| DE | 102012106535 | A1 | 1/2014 | |
| DE | 10 2013 215 670 | A1 | 2/2015 | |
| DE | 10 2014 218 681 | A1 | 3/2016 | |

OTHER PUBLICATIONS

Examination Report dated Jul. 18, 2018 of corresponding German application No. 10 2018 201 036.6; 16 pages.

* cited by examiner

METHOD FOR OPERATING A MOTOR VEHICLE, AND MOTOR VEHICLE

FIELD

The invention relates to a method for operating a motor vehicle.

BACKGROUND

At present, hybrid and/or fully electric motor vehicles are known in the framework of an electrification of the motor vehicle industry. Such motor vehicles have an electric machine either exclusively or in addition to an internal combustion engine. In this case, the electric machine serves, on the one hand, for propelling the motor vehicle, i.e., as a drive motor. On the other hand, the electric machine also serves as a generator for producing (recovering) of electrical energy, for example, which serves to operate the electric machine and/or to operate electrical components of the motor vehicle. In this process, according to the generator principle, the kinetic energy of the moving motor vehicle is utilized to operate the electric machine as a generator and thus to convert the kinetic energy into electrical energy and subsequently to store it, for example, in a battery inside the motor vehicle.

Such a production (recovery) of energy is also known as recuperation. Thus, DE 10 2013 215 670 A1 describes a method for the recuperation of electrical energy within a motor vehicle, during which a mechanical resistance occurring during the generator operation of an electric machine is utilized in addition for the braking of the motor vehicle, especially in the case of an anti-lock braking system (ABS). Such a method is thus also designated as recuperation braking.

DE 10 2014 218 681 A1 describes a method for the braking of a two-wheeled vehicle, especially a bicycle (pedelec), by a recuperation braking by means of electric machines.

Another important aspect is the creation of a redundancy, i.e., the assuring of a replacement, for example, in the event of failure of a safety-relevant component of a motor vehicle.

Thus, for example, there can be found in DE 10 2008 003 379 A1 a redundant brake system for a motor vehicle, especially a utility vehicle, in which the parking brake system is called upon as a replacement brake system upon failure of the service brake system.

Such a redundancy for safety-relevant components is advantageous and often demanded, especially in the field of development of autonomous, i.e., self-driving motor vehicles, which is gaining in importance in addition to the electrification of vehicles.

Starting therefrom, the invention is based on the object of indicating a method for the operation of a motor vehicle with the help of which a motor vehicle can be reliably braked. Furthermore, the invention is based the object of indicating a motor vehicle.

Advantageous embodiments, enhancements and variants are the subject matter of the dependent claims. The benefits and preferred embodiments stated in regard to the method can be applied accordingly to the motor vehicle, and vice versa.

The method serves for the operation, especially for the reduction of velocity of a motor vehicle. The motor vehicle is designed as a motor vehicle driven by an electric motor. By a motor vehicle driven by an electric motor is meant in the present case a passenger car, having either a hybrid drive (electric motor and internal combustion engine), or so-called plug-in hybrid electric vehicles (PHEV, or a purely electric motor drive (electric motor), also designated as a "battery electric vehicle (BEV)".

The motor vehicle in this case has an electric machine for the positive or negative acceleration of the motor vehicle. By positive acceleration is meant in the present case, in particular, a driving of the motor vehicle. The electric machine thus serves as an electric drive motor. By negative acceleration is meant in the present case, in particular, a braking of the motor vehicle by the electric machine. The electric machine in the present case is designed, for example, as a synchronous machine.

Furthermore, the motor vehicle has a mechanical brake device for reducing the speed of the motor vehicle. By mechanical brake device is meant in the present case, for example, a disk brake device or a drum brake device, which brake the motor vehicle by applying friction force.

In order to carry out the method, a deceleration demand is detected in a special brake operation mode. In the present instance, the special brake operation mode means a predetermined manner by which the motor vehicle is braked during a driving operation of the motor vehicle.

In the present case, the deceleration demand means, in particular, a totality of parameters relevant to the braking. Such parameters are, for example, the speed of the motor vehicle prior to braking, the demanded speed of the motor vehicle after the braking, and the time in which the motor vehicle should be braked to the speed after the braking. Thus, a deceleration demand is, for example, the demand to brake the motor vehicle from a velocity of 30 km/h within 10 seconds to a velocity of 10 km/h.

Depending on the deceleration demand, a target rotational speed curve of the electric machine is then determined. The determination as well as the detection of the aforementioned deceleration demand are carried out, for example, by means of a control unit, which is arranged inside the motor vehicle.

The target rotational speed curve is dependent on the deceleration demand and is degressive, i.e., decreasing as a function of time. In other words, the deceleration demand and thus also the target rotational speed curve dependent on it establish how strong the braking must be.

After this, in order to fulfill the deceleration demand, an actual rotational speed of the electric machine is adapted to the so determined target rotational speed curve for reducing the speed of the motor vehicle. Based on a mechanical coupling of a shaft of the electric machine to the wheels of the motor vehicle, in this case, the actual rotational speed stands in correlation with the wheel rotational speed and thus also with the speed of the motor vehicle.

Therefore, in order to reduce the vehicle speed of the motor vehicle, the actual rotational speed of the electric machine is reduced to a speed as dictated by the deceleration demand. The reduction occurs, for example, by an active controlling of the electric machine by the control unit. Alternatively, as long as it is sufficient to fulfill the deceleration demand, the reduction occurs by decreasing the actual rotational speed based on the input of mechanical resistance of the electric machine in the generator operation as mentioned above in the context of the recuperation. In the present case, active controlling of the electric machine means, in particular, a controlled energizing of the electric machine by the control unit adapted to the deceleration demand, in order to reduce the actual rotational speed.

In this way, a braking method that is redundant or additional to the mechanical brake device is designed in order to meet the deceleration demand. In particular, the components of the motor vehicle that are already present will be drawn on for this, such as the electric machine, so that no additional and possibly cost-intensive installation of additional, redundant brake components is needed.

According to one preferred embodiment, the target rotational speed curve is associated with a speed range within which the actual rotational speed is regulated. This allows a possible deviation of the actual rotational speed from the target rotational speed curve, without departing significantly from this target speed curve. This makes it possible to allow for the possible occurrence of unexpected actual rotational speed fluctuations, without negatively affecting the adaptation to the target rotational speed curve and thus the reducing of the speed of the motor vehicle.

In the present instance, the rotational speed range means generally a defined distance from a higher and a lower rotational speed of a particular time-dependent target rotational speed of the target speed curve. For example, the rotational speed range defines a distance from the target rotational speed curve of +/−500 revolutions per minute (rpm). That is, the actual rotational speed may deviate from the target rotational speed curve by +500 rpm or by −500 rpm, without significantly deviating from the target rotational speed curve.

The rotational speed range and thus the predetermined distance are established, for example, within the context of a configuration of the control unit, for example, during the manufacturing of the motor vehicle.

Appropriately, upon approaching the actual rotational speed, the target rotational speed curve is adapted to the distance of the rotational speed range contrary to the curve of the actual rotational speed. For a better understanding, such adaptation will be explained more closely with the aid of the following examples:

The rotational speed range for example, according to the previously mentioned example, is defined at a distance of +/−500 rpm from the target rotational speed curve. If, at a defined moment in time, the target rotational speed curve has a value of 1500 rpm, for example, a deviation of the actual rotational speed from this value by +/−500 rpm is permissible for a regulating and thus the braking of the motor vehicle in the course of the deceleration demand. Now, if the actual rotational speed, for example, approaches the maximum permitted rotational speed of 2000 rpm (starting from 1500 rpm, i.e., from "below") or even exceeds this, the target rotational speed curve will be regulated in the direction of a lower rotational speed, such as 1200 rpm; in particular, it will be adapted so that the actual rotational speed once more follows the target rotational speed curve and thus again lies within the rotational speed range.

The adaptation is carried out analogously in the case of approaching the minimum permissible rotational speed, in the present example 1000 rpm.

In the present case, approaching or exceeding means, in particular, almost reaching (in the case of approaching) or taking on a higher rotational speed value (in the case of exceeding).

In other words: upon approaching or exceeding the rotational speed range "at the top" (i.e., more than 2000 rpm), the deceleration demand is not sufficient to brake the motor vehicle, and thus the actual rotational speed of the electric machine will not be reduced strongly enough. Thus, the target rotational speed curve and consequently also the deceleration demand will be adapted such that the target rotational speed curve has lower rotational speeds and thus the motor vehicle is braked more strongly.

Conversely, upon approaching or exceeding the speed range "at the bottom", i.e., a drop in the actual rotational speed below 1000 rpm, there will be an increase in the target rotational speed curve. In the context of the braking force, an exceeding of the rotational speed range "at the bottom" means that the actual rotational speed drops off too strongly, i.e., the braking is too strong. An increase in the target rotational speed curve causes less deceleration of the motor vehicle and accordingly an adaptation of the actual rotational speed to the "new" target rotational speed curve.

The benefit of this design is to be seen in a wheel slip regulation. By the adaptation of the target rotational speed curve, a wheel slip regulation is realized in that the regulating system creates as much wheel slip as is needed to meet the deceleration demand. However, too much wheel slip is prevented, which would lock the wheels if the braking is too strong, thus making the braking process of the motor vehicle unstable. In the present case, wheel slip means, in particular, a rotational speed difference between roadway and the tread surface of the tires, which are in frictional contact with each other.

In one preferred enhancement, the motor vehicle is braked to a standstill by means of the already described method by the electrical machine, upon failure of the mechanical brake device. In the present case, failure of the mechanical brake device means, in particular, a substantial operational impairment and, in particular, a total loss of function of the mechanical brake device.

This creates a redundancy, especially in terms of a replacement, in order to brake the motor vehicle safely upon failure of the mechanical brake device.

According to one expedient embodiment, a plurality of target rotational speed curves is stored, for example, as characteristic curves in a database, for example, inside the motor vehicle. In this case, a required target rotational speed curve is selected and specified based on the deceleration demand as a function of the vehicle speed. For example, the memorized target rotational speed curves have different variations by which the motor vehicle can be braked from different speeds preferably to a standstill. In the special braking mode, therefore, the control unit accesses the stored target rotational speed curves, selects the target rotational speed curve whose starting vehicle speed agrees at least approximately with the current speed of the motor vehicle and uses this for the actual rotational speed adaptation.

Expediently, an autonomous driving operation is provided for the autonomous control of a driving task of the motor vehicle. The driving task means, in particular, an autonomous driving at low vehicle speed, for example, due to a traffic jam or within a parking garage in the sense of a traffic jam assistant or a parking garage pilot. In particular, the autonomous driving operation is designed for an autonomous driving as of Level 4 of the relevant current standards for an autonomous driving of motor vehicles. One such standard at present is the SAE J3016, for example. In this case, level 4 is means a fully automated driving. The steering of the vehicle is thus taken over entirely by the system and the driver is only asked by the system to steer the vehicle when necessary.

Especially in the autonomous driving operation, the described method enables a safe and largely redundant braking of the motor vehicle—in terms of regulating the wheel slip—upon failure of the mechanical brake device. The steering of the motor vehicle is conducted here, for example, by the already mentioned control unit, which likewise brakes the motor vehicle by means of the electric machine, for example, down to standstill upon failure of the mechanical brake device. Basically, an actuating of the mechanical brake device and the electric machine as a "redundant brake device" takes place by means of separate control circuits.

According to one preferred enhancement, the special brake operation mode is designed solely to reduce the speed of the motor vehicle by a value in the range of 10 km/h to 30 km/h and especially down to a speed of 20 km/h. Preferably the special brake operation mode is used only at slow speeds of at most 30 km/h or at most 20 km/h, especially during a fully autonomous driving operation, such as a traffic jam assistant or a parking garage pilot.

However, the concept described herein is not limited to slow speeds, but rather is also used for braking from higher speeds of, e.g., up to 100 km/h or 130 km/h. The possible speed range is generally dependent on the braking power and the number of electric machines (one or more). Preferably, several electric machines are used, which are designed for reduction at such high speeds. In particular, the several electric machines are designed as wheel hub motors.

Preferably one target rotational speed curve is provided for each electric machine. This can be provided individually for the different machines or through a common target rotational speed curve for all machines. The actual rotational speed is compared to the target rotational speed, in particular, individually for each machine, and is adapted individually to the target rotational speed curve.

The benefit of this enhancement is to be seen in two aspects. On the one hand, the method that is the basis for the special brake operation mode has proven to be suitable in the mentioned vehicle speed range for the safe and reliable braking of the motor vehicle, especially for a braking down to standstill. On the other hand, no additional and costly redundant (mechanical) replacement brake system is needed for driving tasks within this vehicle speed range, such as a traffic jam assistant and/or a parking garage pilot. Therefore, preferably no such system is provided. With the described method—as already mentioned—components that are already present can be utilized. The method described here is therefore especially suitable for implementing (fully) autonomous driving modes in a motor vehicle especially for slow speeds, without additional expense for a redundant mechanical replacement brake system.

Preferably the special brake operation mode is activated only upon a failure of the mechanical brake device. On the one hand, this creates the aforementioned redundancy, and, on the other hand, intervening in the normal operating modes (accelerating and/or recovery of electrical energy) of the electric machine occurs only in an emergency situation.

BRIEF DESCRIPTION OF THE DRAWINGS

Exemplary embodiments of the invention shall be explained more closely below on the basis of the figures. The latter show, partly in highly simplified representations.

In the figures, parts with the same effect are represented with the same reference numbers.

DETAILED DESCRIPTION

Figure 1:
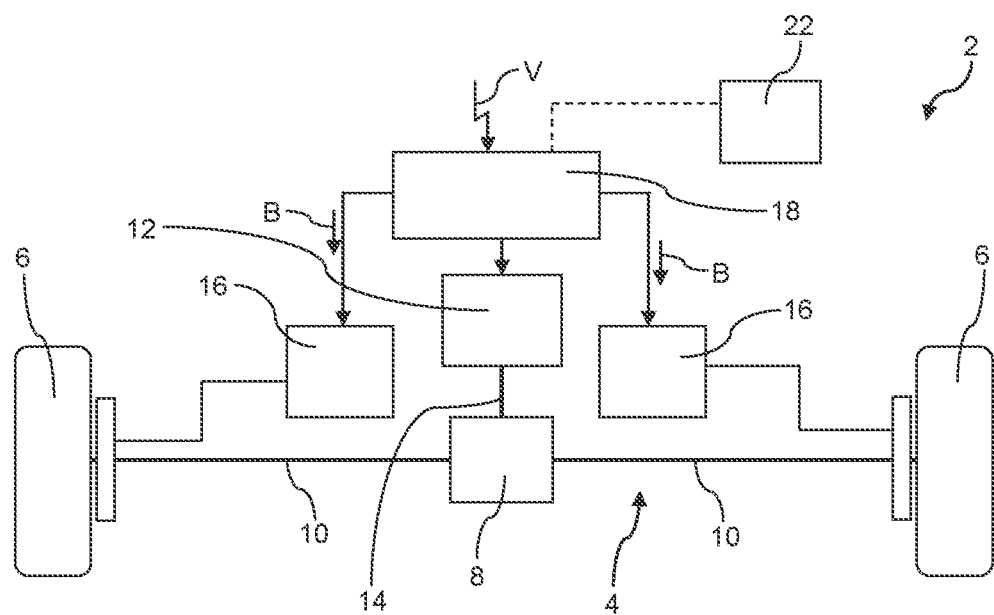
FIG. 1 a schematic partial diagram of a motor vehicle.

FIG. 1 shows a rough partial sketch of a motor vehicle 2, especially one axle 4 of the motor vehicle 2. The axle 4 is, for example, a rear axle or a front axle of the motor vehicle 2. The exemplary embodiments and features discussed below may be applied to a rear axle and/or a front axle.

The axle 4 has a wheel 6 at each end. Furthermore, the axle 4 has a differential 8, which is connected by way of a drive shaft 10 to each of the wheels 6. The differential 8 enables a distributing of the torque needed for the propulsion and a different rotational speed for the wheels 6, for example, when the motor vehicle 2 is negotiating a curve.

The motor vehicle 2 in the exemplary embodiment comprises an electric machine 12 for propelling the motor vehicle 2. Thus, the present exemplary embodiment involves a motor vehicle 2 driven purely by an electric motor. Alternatively, the motor vehicle 2 has both an internal combustion engine and an electric machine for its propulsion, i.e., it is designed in the manner of a hybrid vehicle. The electric machine 12 is connected by way of a driven shaft 14 to the differential.

For the reduction of the vehicle speed, the motor vehicle 2 has a mechanical brake device 16. The mechanical brake device 16 in the exemplary embodiment is designed as a conventional disk brake. Hence, the motor vehicle 2 in the exemplary embodiment has two mechanical brake devices 16, i.e., one for each wheel 6.

The motor vehicle 2 in the exemplary embodiment is designed for autonomous driving. That is, the motor vehicle has a control unit 18, by means of which the motor vehicle 2 is steered in instead of a driver. In other words: the actual driver becomes more of a passenger of the motor vehicle 2. The accelerating, braking and steering are taken over by the control unit 18. For example, a deceleration demand V is detected by the control unit 18, i.e., the need to reduce the vehicle speed in a given time, and, on the basis of the deceleration demand V, a brake signal B is generated. The brake signal B is then relayed to the mechanical brake device 16, which exerts a braking torque on the wheels 6 based on the brake signal B.

In the case of a failure of the mechanical brake device 16, i.e., at least a substantial operational impairment, for example, the motor vehicle 2 and especially the control unit 18 are designed to determine, depending on the detected deceleration demand V, a target rotational speed curve $n_{soll}$ of the electric machine 12, and to generate the necessary braking torque by the electric machine 12. In other words: the electric machine 12 thus serves as a redundancy for the mechanical brake device 16, in order to brake the motor vehicle 2.

Figure 2:
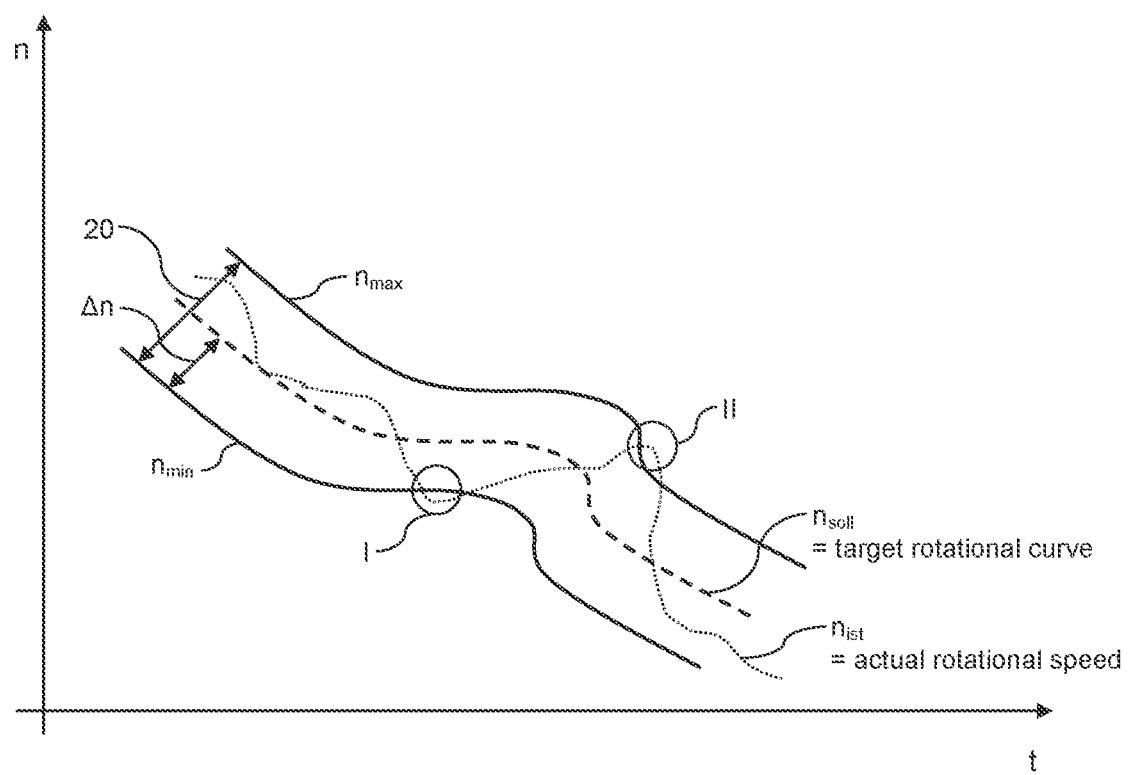
FIG. 2 a rotational speed curve plotted as a function of time.

Now, for a more precise explanation, the method shall be discussed in further detail in FIG. 2. FIG. 2 sketches the rotational speed n of the electric machine 12 as a function of time t.

As already mentioned, the control unit 18 determines a target rotational speed curve $n_{soll}$ in dependence on the deceleration demand V. Since the target rotational speed curve $n_{soll}$ serves for a braking of the motor vehicle, especially down to standstill, it has a declining trend. That is, the target rotational speed decreases in value as the time t progresses. The target rotational speed curve $n_{soll}$ is associated with a rotational speed range 20. The rotational speed range 20 has a given distance $\Delta n$ from the target rotational speed curve $n_{soll}$. In other words: the rotational speed range 20 is defined by a maximum rotational speed $n_{max}$ and by a minimum rotational speed $n_{min}$.

In order to reduce the vehicle speed of the motor vehicle 2, an actual rotational speed $n_{ist}$ of the electric machine 12 is adapted to the target rotational speed curve $n_{soll}$. The adaptation is carried out, for example, by an active energizing of the electric machine 12, generating a braking torque.

In order to prevent too much wheel slip occurring at the wheels 6 during the braking by means of the electric machine 12, thereby making the braking process unstable and uncontrollable, the target rotational speed curve $n_{soll}$ is adapted depending on the wheel slip.

For example, if the actual rotational speed $n_{ist}$ falls below the rotational speed range 20 and thus the minimum rotational speed $n_{min}$ (see I), then the braking torque generated by the electric machine 12 is too strong and there is a danger of locking of the wheels 6. In the present instance, the control unit 18 therefore adapts the target rotational speed curve $n_{soll}$ such that it is "displaced" in the direction of a higher rotational speed and thus a lower braking torque is generated by the electric machine 12. Hence, the wheel slip that is indirectly correlated with the braking torque is regulated, so that enough wheel slip to brake the motor vehicle 2 is generated during the braking process, but not too much wheel slip, which would result in a locking of the wheels 6 and making the braking process uncontrolled.

Conversely, the above described adaption occurs analogously in the case of exceeding the rotational speed range 20 and thus the maximum rotational speed $n_{max}$ (see II).

In particular, the above described method is designed for braking the motor vehicle 2 from vehicle speeds with a value of 10 km/h to 30 km/h, for example, during the operation of a parking garage pilot, during which the control unit 18 steers the motor vehicle autonomously through a parking garage.

The individual target rotational speed curves $n_{soll}$ are stored, for example, in a database 22, and a target rotational speed curve $n_{soll}$ is selected and specified, for example, by the control unit 18, based on the deceleration demand V as a function of the vehicle speed.

The invention is not limited to the above described exemplary embodiments. Instead, other variants of the invention may also be derived from it by the person skilled in the art, without leaving the subject matter of the invention. In particular, moreover, all individual features described in connection with the exemplary embodiments may be otherwise combined with each other, without leaving the subject matter of the invention.

The invention claimed is:

1. A method for operating a motor vehicle, comprising:
   accelerating positively or negatively, by an electric machine, the motor vehicle;
   reducing, by a mechanical brake device, the vehicle speed of the motor vehicle;
   detecting a deceleration demand (V) in a special brake operation mode;
   determining a target rotational speed curve ($n_{soll}$) of the electric machine in dependence on the deceleration demand (V); and
   adapting an actual rotational speed ($n_{ist}$) of the electric machine for reducing the vehicle speed of the motor vehicle to the determined target rotational speed curve ($n_{soll}$),
   wherein upon approaching the actual rotational speed ($n_{ist}$) to a rotational speed range, the target rotational speed curve ($n_{soll}$) is adapted in an opposite direction of the curve of the actual rotational speed ($n_{ist}$).

2. The method as claimed in claim 1, wherein the rotational speed range is assigned to the target rotational speed curve ($n_{soll}$), wherein the rotational speed range defines a given distance ($\Delta n$) from the target rotational speed curve ($n_{soll}$), and the actual rotational speed ($n_{ist}$) is regulated within the rotational speed range.

3. The method as claimed in claim 1, wherein the motor vehicle is braked to a standstill by means of the electric machine in case of a failure of the mechanical brake device.

4. The method as claimed in claim 1, wherein a plurality of target rotational speed curves ($n_{soll}$) is stored in a database, and the target rotational speed curve ($n_{soll}$) is selected from the plurality of target rotational speed curves ($n_{soll}$) and specified based on the deceleration demand (V) as a function of the vehicle speed.

5. The method as claimed in claim 1, wherein an autonomous driving operation is provided for the autonomous control of a driving task of the motor vehicle, and the special brake operation mode occurs, in particular, only during the autonomous driving operation.

6. The method as claimed in claim 1, wherein the special brake operation mode is designed solely for reducing the vehicle speed of the motor vehicle by a value in the range of 10 km/h to 30 km/h.

7. The method as claimed in claim 1, wherein several electric machines are used for the positive or negative acceleration, especially wheel hub motors.

8. The method as claimed in claim 1, wherein the special brake operation mode is activated only in case of a failure of the mechanical brake device.

9. A motor vehicle comprising:
   an electric machine for the positive or negative acceleration of the motor vehicle and
   a mechanical brake device for reducing the vehicle speed of the motor vehicle, wherein a control unit is provided for the control of a special brake operation mode and
   the control unit is designed such that, during operation in the special brake operation mode, a deceleration demand (V) is detected;
   a target rotational speed curve ($n_{soll}$) of the electric machine is determined in dependence on the deceleration demand (V); and
   an actual rotational speed ($n_{ist}$) of the electric machine for reducing the vehicle speed of the motor vehicle is adapted to the target rotational speed curve ($n_{soll}$) so determined, wherein upon approaching the actual rotational speed ($n_{ist}$) to a rotational speed range, the target rotational speed curve ($n_{soll}$) is adapted in an opposite direction of the curve of the actual rotational speed ($n_{ist}$).

\* \* \* \* \*